(12) United States Patent
Turner et al.

(10) Patent No.: US 9,759,625 B2
(45) Date of Patent: Sep. 12, 2017

(54) DIFFERENTIAL PRESSURE TRANSDUCER ASSEMBLY WITH OVERLOAD PROTECTION

(71) Applicant: tecsis GmbH, Offenbach (DE)

(72) Inventors: Robert Turner, Circleville, OH (US); Pavel Gvantmakher, Gahanna, OH (US); Reinhold Ost, Bayern (DE); Bruce Yohr, Gahanna, OH (US); Mark Jones, Marion, OH (US)

(73) Assignee: Tecsis GmbH, Offenbach (DE)

( * ) Notice: Subject to any disclaimer, the term of this patent is extended or adjusted under 35 U.S.C. 154(b) by 101 days.

(21) Appl. No.: 14/858,057

(22) Filed: Sep. 18, 2015

(65) Prior Publication Data

US 2017/0082515 A1   Mar. 23, 2017

(51) Int. Cl.
| | | |
|---|---|---|
| G01L 19/06 | (2006.01) | |
| G01L 9/00 | (2006.01) | |
| G01L 13/00 | (2006.01) | |
| G01L 13/02 | (2006.01) | |

(52) U.S. Cl.
CPC ........ *G01L 19/0618* (2013.01); *G01L 9/0052* (2013.01); *G01L 9/0072* (2013.01); *G01L 13/025* (2013.01)

(58) Field of Classification Search
CPC ....... G01L 19/06; G01L 19/0618; G01L 9/00; G01L 9/0052; G01L 9/0072; G01L 13/00; G01L 13/025
See application file for complete search history.

(56) References Cited

U.S. PATENT DOCUMENTS

| | | | | |
|---|---|---|---|---|
| 3,559,488 | A | * | 2/1971 | Weaver ................. G01L 9/0052 73/720 |
| 4,072,058 | A | | 2/1978 | Whitehead, Jr. |
| 4,135,408 | A | * | 1/1979 | Di Giovanni ......... G01L 13/025 338/4 |
| 4,329,877 | A | | 5/1982 | Hershey |
| 4,543,832 | A | * | 10/1985 | Van Over ............... G01L 9/006 277/644 |
| 4,668,889 | A | | 5/1987 | Adams |
| 7,497,127 | B2 | | 3/2009 | Burczyk et al. |

FOREIGN PATENT DOCUMENTS

WO    WO 2005/098387 A1    10/2005

* cited by examiner

*Primary Examiner* — Nguyen Ha
(74) *Attorney, Agent, or Firm* — Muncy, Geissler, Olds & Lowe, P.C.

(57) ABSTRACT

A pressure overload protector for a sensor includes a pressure-filled channel system fillable with fluid or gas, a first overload stop seated in an open position, a first diaphragm at the unseated end of the first overload stop, a second overload stop seated in an open position, a second diaphragm at the unseated end of the second overload stop, a sensor connected to a fluid channel, and a third and fourth overload stop connected by channels to the fluid channel of the sensor and terminating at a fluid exit. The overload protector provides bidirectional over and under pressure protection to the sensor.

20 Claims, 4 Drawing Sheets

DIFFERENTIAL PRESSURE TRANSDUCER ASSEMBLY WITH OVERLOAD PROTECTION

FIELD OF THE INVENTION

The present device relates to a differential pressure transducer assembly with overload protection.

BACKGROUND OF THE INVENTION

Differential pressure sensors convert pressure fluctuations into electrical signals using piezo-electric or semi-conductor sensors. Early sensors were mechanical and could handle higher pressure fluctuations but were not as accurate and did not output digital data. The modern sensors are more fragile and require overpressure protection.

Over-pressure protection and under-pressure occur frequently in an input/output system or hydraulic system under pressure. Pressure fluctuations, especially in incompressible fluids, can change very quickly. These fast and repeated pressure fluctuations require durable and responsive protection systems.

The disclosure of U.S. Pat. No. 4,072,058 to Whitehead provides a pressure sensor protector that includes two pairs of chambers and two pairs of diaphragms. The first two diaphragms on the inlet and outlet ends of the protection device deform in over or under-pressure conditions to cut off flow to the internal chambers. Since these deformations can be slow, the protection device contains a second internal pair of diaphragms. The first diaphragms define a first pair of chambers and the second diaphragms define a second central chamber, each chamber provided with fluid channels which transfer pressure from one side to the next through a fill fluid.

In an over-pressure situation, the inlet side diaphragm would compress against the wall of the first chamber and cut off flow. However, the deformation increases the pressure in the chamber and forces the internal diaphragms to deform. This equalizes pressure and, ideally, protects against the pressure surge. The device also provides pressure bypasses between chambers to speed the equalization. A similar fluid-filled overpressure protector with fluid bypass channels is disclosed in U.S. Pat. No. 4,329,877 to Hershey.

However, the fill fluids (usually incompressible fluids) present several disadvantages and challenges. First, fill fluids that escape may contaminate the larger system or create explosion hazards. Second, the fill fluid is subject to expansion and contraction with temperature, such that the temperature range over which the unit can remain calibrated is limited. Third, compressibility of the fill fluid further limits the maximum line pressure that the unit can operate at.

In fluid filled designs, even after the overload protection engages, a fraction of the overload pressure will continue to be seen by the sensor. This is due to the unintended deformation of the internal components from the increasing overload condition. This is most severe when the sensor is a miniature silicon piezo-resistive or silicon capacitive type of low capacity since they are sensitive to minute volume changes.

Additionally, fluid-filled designs can inadvertently allow permeation by small molecules such as hydrogen which affect the calibration and accuracy of the sensor. Also, fluid-filled designs are inherently more expensive to build and require extensive measures to degas and properly fill. Thus, they also require higher skill levels to assemble and adjust for performance.

The disclosure of U.S. Pat. No. 4,668,889 to Adams discloses a non-fluid-filled design which uses biasing springs in the internal chamber to replace the fill fluid. This arrangement allows the device to be scaled down further than other designs while maintaining durability. However, this disclosed design would require fluid flow restrictors in order to allow the system to react quickly enough. These flow restrictors would also limit the frequency response of the sensing element and would not protect against larger flow rates. Accordingly, the device disclosed herein addresses the issues to provide a scalable, fast acting redundant over and under pressure protection system.

SUMMARY OF THE INVENTION

Certain exemplary embodiments of the invention are directed to a pressure overload protector. The pressure overload protector includes a body, a first overload valve on a first pressure port seated in an open position, a first diaphragm at the unseated end of the first overload stop valve, a second overload stop valve seated in an open position opposite the first overload stop valve, a third and fourth overload stop valves opposite each other, a second diaphragm in between the third and fourth overload stop valves, and a pressure sensor.

According to an exemplary embodiment, a differential pressure measurement system includes a two stage sensor protector to avoid any destruction or malfunction or deviation in accuracy by protecting the sensor from overpressure peaks or pressure drops for a differential pressure transducer with two pressure ports, which are working directly with the medium of the application. Therefore, each channel pressure port has overload protection and pressure drop protection provided by overload stop valves which protect the sensor opening or closing channels within the transducer system.

The design is especially made without any flow restrictor, to allow for response to very fast pressure spikes with a high response time also under high frequency spikes. Therefore, each pressure port is protected with an overload protection and a pressure drop protection by valves, which protect the sensor opening or closing channels within the transducer system.

A pressurized fluid flows into the first pressure port, through the first overload stop valve, through a first channel in the body to the third overload valve, and then through a second channel to the pressure sensor. After reaching the pressure sensor, the pressurized fluid flows into a third channel, through the fourth overload valve, into a fourth channel to the second overload valve, and out a second pressure port.

The instant design virtually eliminates any additional pressure from being transmitted to the sensor once the overload stop valves engage. In fact, as external pressure is increased the internal pressure decreases slightly. The overload stop valves include O-rings which provide a seal between the valve core and the transducer body in excess pressure events. As the O-rings of the overload stop valves compress with increased pressure, the diaphragm is displaced in such a manner to increase the internal volume, and thus, lower the internal pressure.

Using a diaphragm is also advantageous compared to using a coiled spring to protect against rapid pressure changes. As the diaphragm deflects to close off the incoming pressure port, it also increases the internal volume of the high pressure side cavity. The increasing volume has a pressure lowering effect to offset any sudden pressure spikes. This allows the transducer to maintain a very high frequency response within the operating range, but still provide protection against high frequency overloads. This response parameter can be tuned by changing the diaphragm area, thickness, and convolution profile.

The instant device designs are an improvement in cost, reliability and frequency response over existing designs. In addition, the designs overcome the limitations present in units requiring a fill fluid as part of the overload protection scheme.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
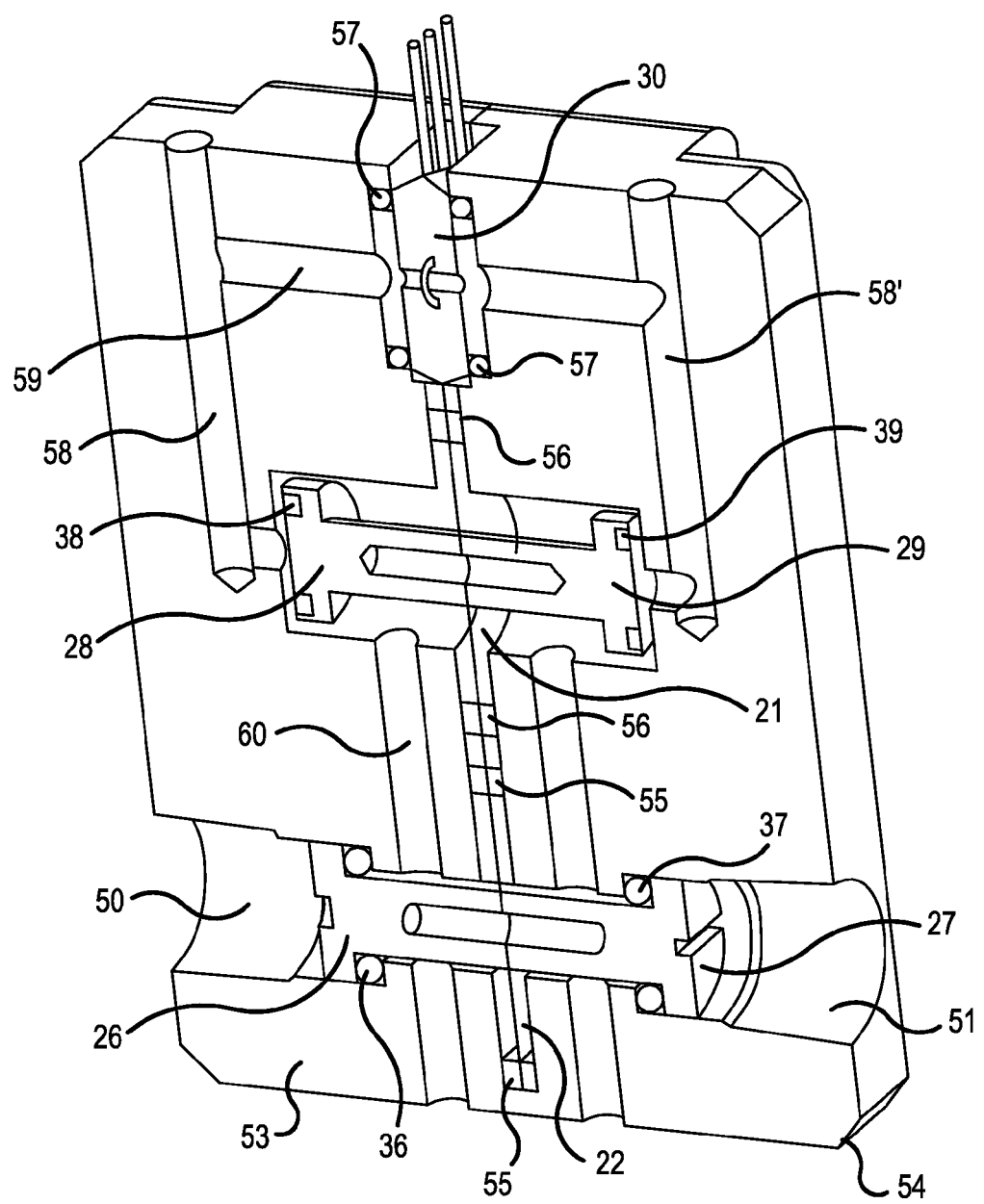
FIG. 1 is a cross-section of the over-pressure protection device and pressure sensor according to an exemplary embodiment of the present invention.

The device of FIG. 1 provides two diaphragm mechanisms, which protect against pressure increases and decreases. For example, overload stop valves 26 and 27 protect against increasing pressure and overload stop valves 28 and 29 protect against sudden pressure release. Together, the two valves 28 and 29 provide excess pressure protection for a differential pressure sensor 30.

Each overload stop valve 26, 27, 28 or 29 is seated in an open and unbiased position substantially perpendicular to diaphragm elements 21 or 22. Each overload stop valve 26, 27, 28 or 29 includes a wide end or head, which is seated between a lip in the first pressure port and a main body of the protection device. Each overload stop valve also includes a short end which extends up to the diaphragm element 21 or 22. The diaphragm elements 21 or 22 can be made of, for example, a metal or an alloy, and can be flat or made with a wave structure. However, any other structure which allows and optimizes deflection can be used.

During normal operations the device has two isolated volumes of gas or liquid, which surround the diaphragm elements 21 and 22. In an exemplary embodiment, separation of gases or liquids is maintained by seals 55, 56. Likewise, seal 57 keeps the pressure sensor isolated from outside pressures. However, the separation provided by the seals, could also be supplied by O-rings, elastomeric seals, adhesives, welding, or metal compression mechanisms.

Compatibility of a given gas or liquid can be varied by using different pressure sensing elements 30. The sensing element 30 can be mounted inside the device as shown. It may also be mounted externally and connected via hoses or tubes. External pressures, which are to be measured by the device, are communicated to the internal liquid or gas volumes through ports 50 and 51.

Under normal operating conditions, pressure changes occur at port 50 and are transmitted around overload stop valve 26. The pressure changes continue through fluid channel 60, around overload stop valve 28, and through fluid channels 58 and 59. At this point the pressure change is sensed by pressure sensing element 30. The exemplary embodiment shown in FIG. 1 is symmetrical with a similar flow path through channels 58' on the other side of the sensor starting at port 51.

The dynamic characteristics of the pressure flow, valve or pressure overload response can be changed in various ways including: changing channel diameter and lengths, changing the head diameter of the overload stops 26, 27, 28 or 29, changing the diameter of the diaphragms 22 and 21, or changing the mass of the overload stop valves 26, 27, 28, and 29. In addition, these feature changes can be implemented asymmetrically. Such changes allow the design to be adapted to provide protection at all possible pressure overloads and for all possible durations. This both protects the sensor 30 and also allows the device to transmit accurately to the sensor 30 the amplitude and duration of every pressure signal.

When the pressure of one pressure port has a significantly higher pressure relative to the other port, the overload stop valve 26 or 27 will move towards the port with lower relative pressure. As an O-ring 36 or 37 in the overload stop 26 or 27 engages the body 53 or 54, the O-ring will isolate the internal chamber with the high relative pressure from the port with the higher relative pressure. As the overload stop valve 26 or 27 moves and the O-ring engages, movement or deformation of diaphragm 22 increases the volume in the cavity with higher relative pressure. The diaphragm 22 can also be replaced with spring-based valves or the like that produce the same effect.

The increased volume will work to lower the pressure in that cavity. This effect will continue as the O-ring is deformed until the forces balance with the external pressure. This effect is advantageous during rapid pressure increases, were the overload stop valve 26 or 27 alone would not move fast enough to protect against a pressure spike. While O-rings are shown in this embodiment, other known sealing methods could be used. For example, gaskets or ball or conical to surface sealing methods.

The device of FIG. 1 also protects against sudden decompressions from either port 51 or 50. It is not uncommon for a very low range pressure to be measured as a result of slight differences between two areas of very high pressure. For example, when used to measure high pressure flow or when making level measurements in a pressurized tank. Without protection, the sensor would be destroyed as pressure suddenly dropped on one side. The overload stop valves 28 and 29 and diaphragm 21 protect against these types of events using O-rings 38 and 39. The diaphragm 21 or 22 with its spring function can also be replaced by a solid wall combined with one or two springs to create spring-based valves. In addition, spring-based valves could be added into the channels to produce the same effect.

When one pressure port experiences a pressure drop relative to the other port, the overload stop valve 28 or 29 moves towards the side with lower relative pressure. O-rings on overload stop valves 28 or 29 engage and seal off the pressure cavity, closing the channel to the sensor. This prevents further decrease in pressure on the side with lower relative pressure. The quality of the seal will determine how long the protection can be maintained.

Furthermore, the deflection of diaphragm 21 during this condition causes an increase in volume on the side with the higher relative pressure. Thus, as the pressure drop is stopped on one side, the pressure is simultaneously reduced on the side with the higher relative pressure. This combined effect provides for protection under rapid pressure decreases such as when a pressure line breaks.

The overload stop valves 26 and 27 are also readily adaptable to non-differential pressure units. By removing elements 21, 27, 28 and 29, the overload protection is no longer bidirectional and is suitable for single pressure port sensors. The device of FIG. 1 shows a low cost sensor module 30; however, almost any strain gage, piezo-resistive or capacitance based pressure sensor could be incorporated into the design. This sensor can be electrically connected to a computer or other measurement recording device.

Figure 2:
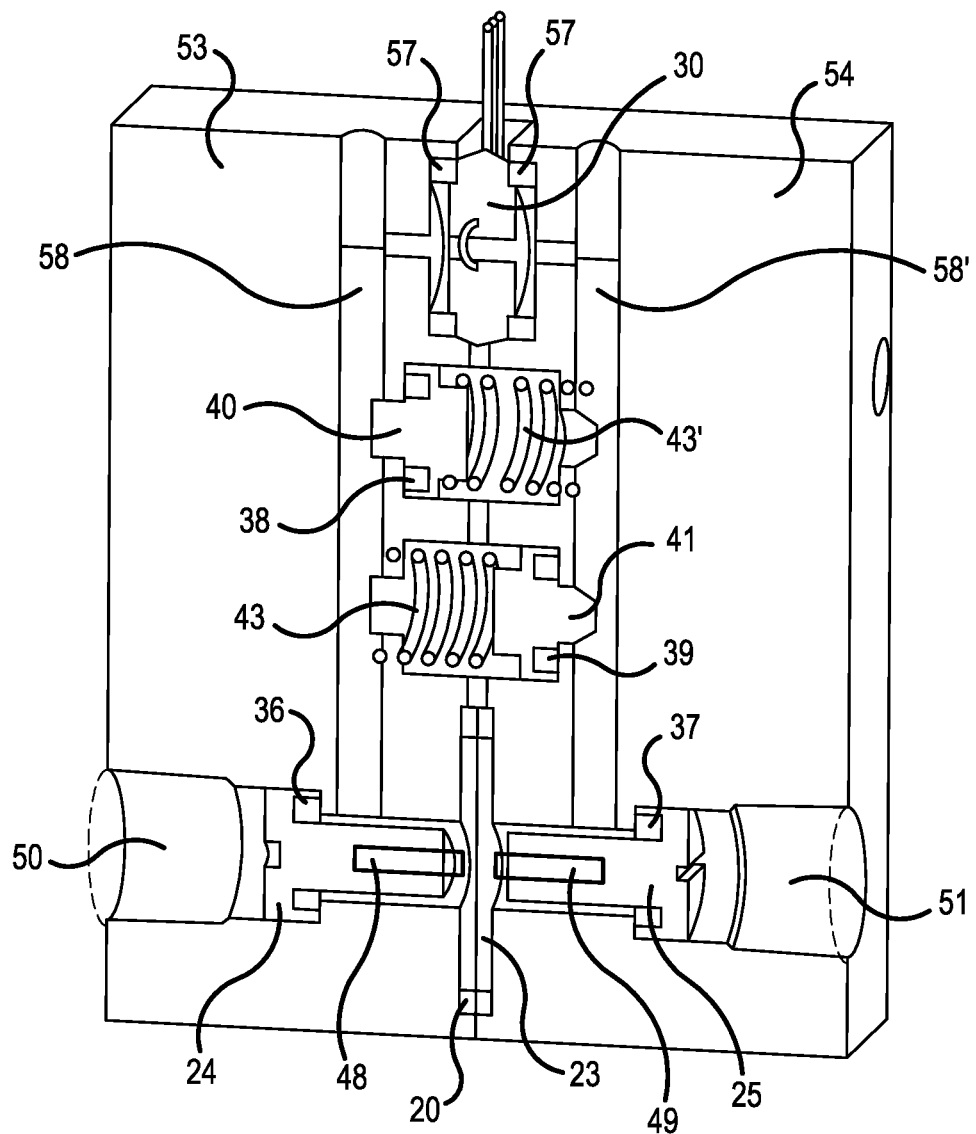
FIG. 2 is a cross-section of the over-pressure protection device and pressure sensor according to an exemplary embodiment of the present invention.

The device of FIG. 2 discloses a second design, which provides overload protection to a differential pressure sensor. Overload stop valve assembly 23, 24 and 25 is similar to overload stop valve assembly 22, 26 and 27 of FIG. 1, the operation of which is described above. For conditions when one pressure port receives a significant pressure drop relative to the other port, pressure relief (bypass) valves 40 and 41 provide protection by allowing the side with higher relative pressure to vent to the side with lower relative pressure bypassing the sensor. The pressure relief valves 40 and 41 are biased in a closed position by springs 43 and 43' or other forcing members. One advantage of this embodiment over the exemplary embodiment of FIG. 1 is that this protection can last for an indefinite period of time. The pressure relief valves 40 and 41 can be cylindrical plunger valves.

The exemplary embodiment of FIG. 2 provides for overload protection by combining the high pressure protection offered by diaphragm 22 and spring pressure relief valves 40 and 41. This design is improved in reliability due to the incorporation of seal 20. Also, by including the diaphragm 23 and overload stop valves 24 and 25, the device can now protect against high flow rate or rapid pressure changes without relying on the flow restrictors. In comparison to the exemplary embodiment of FIG. 1, each overload stop valve 24 or 25 is in contact with the diaphragm 23 via a pin 48 or 49 which is introduced into the bore of the valve plunger. For adjustments or fine tuning the length of the pins could easily adjusted without adjusting the plunger itself. Instead of the pin, a screw or other spacer are applicable to allow adjustments of the valves pressing on the diaphragm.

Each overload stop valve 40 and 41 can be arranged within the body coaxially on one level, similar to the overload stop valves 24 and 25. This arrangement would reduce the height of the body needed by the body parts 53 and 54. However, it would also require more bores to connect the valves at that level with the fluid channels.

When relief valves, such as those of Adams, are used, they compromise the reliability of the unit. To provide protection for low range pressure sensors, the relief valves must be set with a relatively low spring force. This in turn allows a small amount of leakage between sides, even under normal operating conditions. This leads to inaccuracy in the pressure measurement. Additionally, the leakage of fluid may not be acceptable in some systems. The design shown in FIG. 1 of this application completely eliminates leakage between sides under both normal and overload conditions.

By relying on pressure relief valves, the prior art not only compromises reliability under normal operating conditions, it is also less reliable under overload conditions. The overload protection of FIG. 1 is not pre-stressed under normal operating conditions and, unlike springs, is not subject to relaxation over time in the flexing diaphragm. Also it is not as susceptible to galvanic corrosion as might be seen with the stops of Adams. Corrosion in the long-run could prevent it from opening during overload conditions or allow leakage under normal conditions.

At times, however, there are advantages to incorporating relief valves that outweigh the disadvantages. For example, it may lower costs in some applications. The device of FIG. 2 provides for overload protection by combining the high pressure protection offered by a diaphragm with spring pressure relief valves. This design is improved in reliability due to the incorporation of O-ring seals 36, 37, 38 and 39. Also, by including the diaphragm and overload stop valves, the device can now protect against high flow rate or rapid pressure changes without relying on the flow restrictors of Adams. Therefore, the sensor can maintain a high response to pressure changes within its normal operating range.

Figure 3:
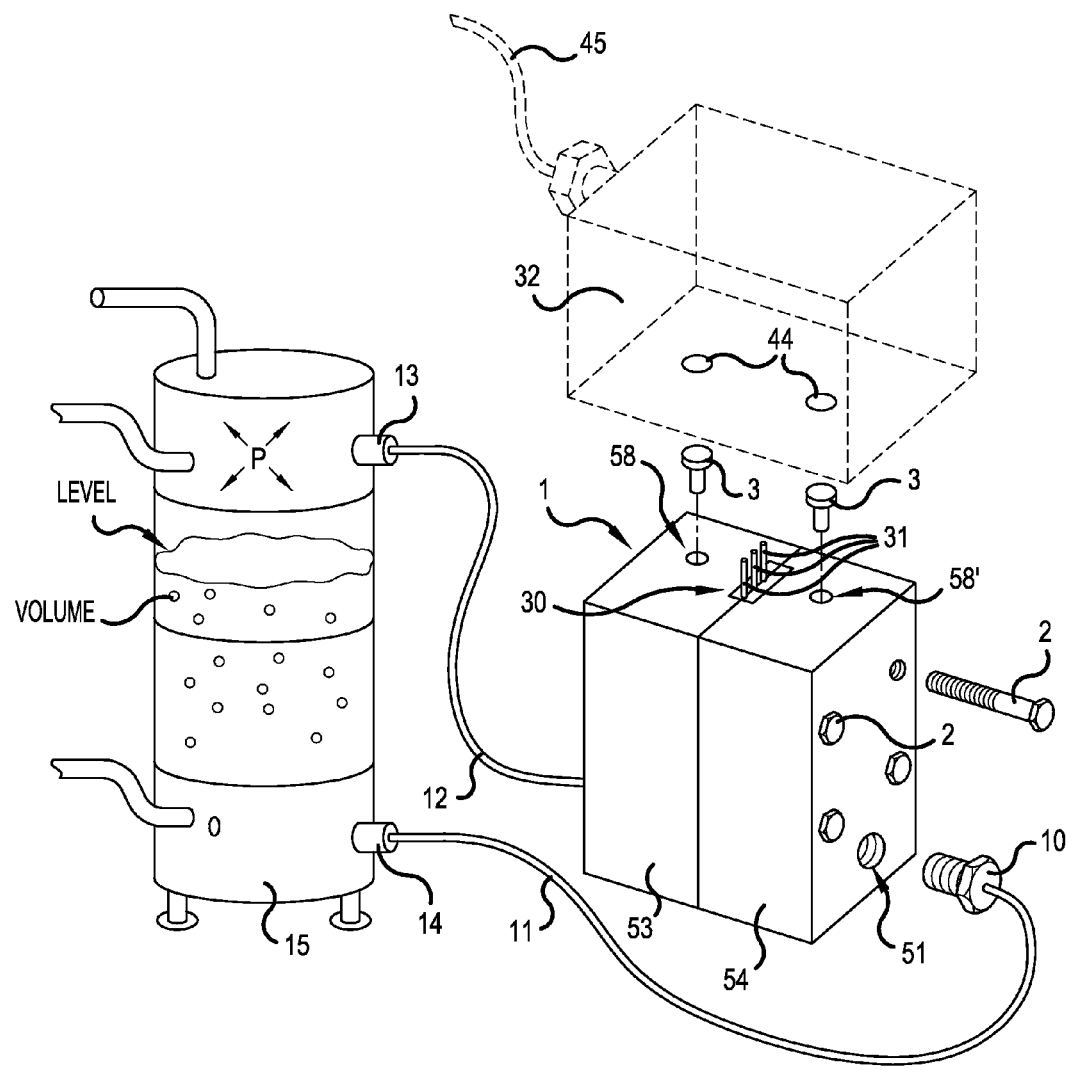
FIG. 3 is a diagram of a larger system application of the disclosed device.

FIG. 3 discloses an exemplary application of the disclosed device, showing the transducer 1 being assembled out of the two parts 53, 54 together with bolts 2. Sensing element 30 with signal output lines 31 may be covered by a connector or protection head 32 shown with dotted lines connected by bolts 3 fitted in recesses 44 of the head 32. The head 32 may contain an electronic circuit which transforms the signal of the sensor 30 and its connection pins to a industry standard signal which can be transmitted via line 45 to an target device or process switch room. The pressure ports 51 and 50 of the transducer are connected from end fitting 10 (other end fitting not shown) via fluid lines 11 and 12 to ports 13 and 14 of a containment 15. With the differential sensor a static pressure of a level of fluid in the containment could be measured without the influence by an inside pressure P of the containment. Also the pressure sensor 30 could be placed in the head 32 or externally and connected via fluid tubes to the overload protector via external ports of internal fluid paths closed by bolts 3.

The transducer is made for operation 500 mBar full scale, optionally it can be applicable also under 10"h20 to over 200 PSI. The valves are designed in general to open above the full scale range and below the proof pressure of the sensor. For example, opening pressure can be set about 10 psi. This corresponds to a diaphragm around 0.006 inches thick, diameter of 1.050 inches, and travel (distance between seal 55 or 56 and sealing surface) of around 0.015 inches. The level and volume of the containment 15 are substantially proportional to the change in pressure P.

Figure 4:
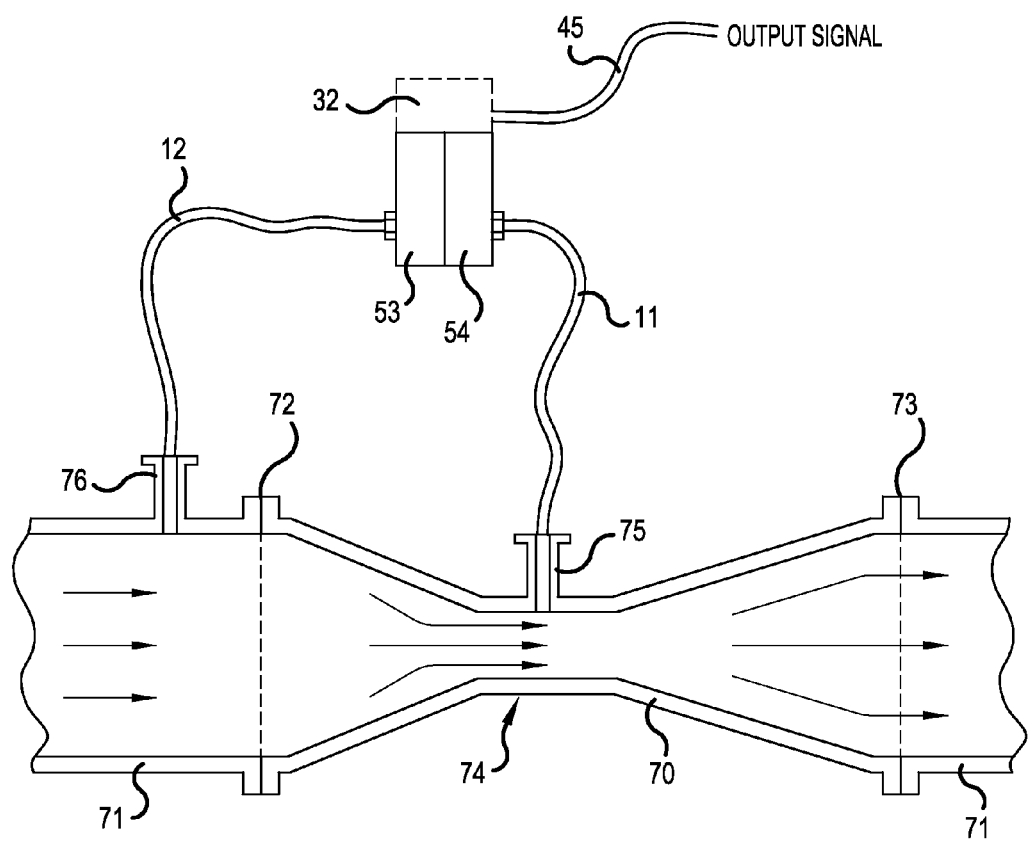
FIG. 4 illustrates an exemplary application of the disclosed device.

FIG. 4 discloses an exemplary application of the disclosed device, showing the transducer 1 being assembled out of the two parts 53 and 54, and head 32 that outputs a sensor signal with 4-20 mA standard voltage supplied to an analog or HART or any other field bus. Using the differential sensor and overload protector, a fluid flow in the tubes 71 and 70, joined at 72 and 73, could be measured by taking the difference of normal pressure at a port 76 and the pressure from a port 75 at a downstream location 74.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pressure overload protector, comprising:
a body;
a first overload valve on a first pressure port;
a second overload valve on a second pressure port;
a first diaphragm, wherein the first overload valve and the second overload valve are disposed on opposite sides of the first diaphragm;
a third overload valve disposed inside the pressure overload protector;
a fourth overload valve disposed inside the pressure overload protector;
a second diaphragm, wherein the third overload valve and the fourth overload valve are disposed on opposite sides of the second diaphragm.

2. The pressure overload protector of claim 1, further comprising at least one seal that provides a seal between the first diaphragm and the body of the pressure overload protector, and at least another seal that provides a seal between the second diaphragm and the body of the pressure overload protector.

3. The pressure overload protector of claim 1, wherein the first overload valve, the second overload valve, the third overload valve and the fourth overload valve are each a cylindrical plunger valve.

4. The pressure overload protector of claim 3, wherein each cylindrical plunger valve includes a wide end and a narrow end.

5. The pressure overload protector of claim 4, wherein the wide end of the first overload valve is seated between a projection within the first pressure port and the body, and wherein the wide end of the second overload valve is seated between a projection within the second pressure port and the body.

6. The pressure overload protector of claim 1, wherein the first and second overload valves protect the sensor against an excess pressure originating from the first pressure port or the second pressure port, and the first diaphragm increases a volume on the side of the excess pressure.

7. The pressure overload protector of claim 1, wherein the third and fourth overload valves protect the sensor against an excess depressurization originating from the first pressure port or the second pressure port, and the second diaphragm reduces a volume on the side of the excess depressurization.

8. The pressure overload protector of claim 1, wherein pressurized fluid flows into the first pressure port, through the first overload valve, through a first channel in the body to the third overload valve, and then through a second channel to the pressure sensor.

9. The pressure overload protector of claim 1, further comprising a pressure sensor inserted into a channel between the first and second pressure ports, and wherein the body of the overload protector is composed of two substantially symmetrically identical parts.

10. The pressure overload protector of claim 1, wherein the pressure sensor is a miniature silicon piezo-resistive or silicon capacitive-type sensor.

11. The pressure overload protector of claim 1, further comprising at least one seal sealing one side of the first diaphragm from an opposite side of the first diaphragm.

12. The pressure overload protector of claim 1, further comprising at least one seal sealing one side of the second diaphragm from an opposite side of the second diaphragm.

13. A pressure overload protector, comprising:
a body;
a pressure sensor;
a first overload valve on a first pressure port;
a second overload valve on a second pressure port;
a first diaphragm, wherein the first overload valve and the second overload valve are disposed on opposite sides of the first diaphragm;
a first fluid valve protecting the pressure sensor from under-pressure in a first channel;
a second fluid valve protecting the pressure sensor from under-pressure in a second channel.

14. The pressure overload protector of claim 13, further comprising at least one seal providing a seal between the first diaphragm and the body.

15. The pressure overload protector of claim 13, wherein the first fluid valve is a bypass valve and the second fluid valve is a bypass valve, wherein the first fluid bypass valve and the second fluid bypass valve include springs, which provide a biasing force.

16. A differential pressure measurement system, comprising:
two fluid channels connected to a first pressure port and a second pressure port; and
a pressure sensor connected on two sides to the two fluid channels;
each of the two fluid channels including:
a first overload stop valve that closes under high frequency pressure increases; and
a second overload stop valve that closes under high frequency pressure drops.

17. The differential pressure measurement system of claim 16, further comprising at least one large chamber separated by a diaphragm into two sealed chambers, wherein each sealed chamber is connected to one of the two fluid channels.

18. The differential pressure measurement system of claim 16, further comprising two large chambers each separated by a diaphragm into two sealed chambers,
wherein the first and second overload stop valves in each channel each include a plunger, and wherein each plunger is arranged in a sealed chamber adjacent to a side of one of the two diaphragms.

19. The differential pressure measurement system of claim 17, further comprising two symmetrically identical bodies, each body including one of the two fluid channels and the first or second pressure port, each body further including a slot for receiving the pressure sensor, wherein the pressure sensor and/or the diaphragm is arranged between the two bodies.

20. The differential pressure measurement system of claim 18, further comprising at least one O-ring on the first and second overload stop valves of each fluid channel, wherein each plunger is in connection with the corresponding diaphragm of the large chamber, wherein if equal pressure exists on both fluid channels each plunger allows a fluid to flow through the fluid channels, and wherein if a pressure difference exists between the two fluid channels one of the first or second overload stop valves in one of the two fluid channels will close.

* * * * *